Patented Nov. 28, 1939

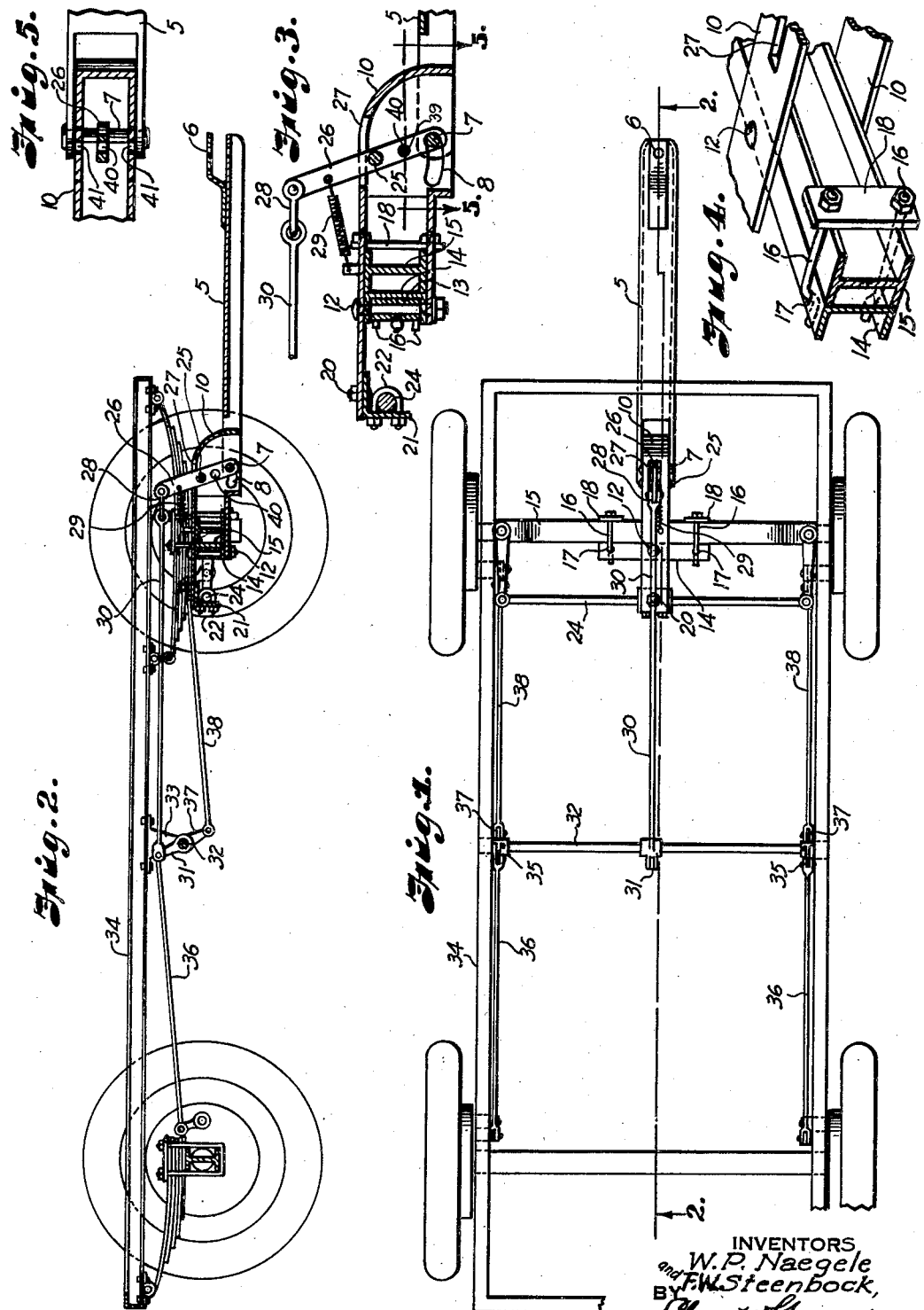

2,181,736

UNITED STATES PATENT OFFICE 2,181,736

TRAILER HITCH WITH BRAKE-OPERATING MEANS

William P. Naegele, Lucas, and Fred W. Steenbock, Sylvan Grove, Kans.

Application July 22, 1938, Serial No. 220,666

1 Claim. (Cl. 188—142)

The present invention relates to trailer hitch devices, and aims to provide an improved trailer hitch connection between towing and trailed vehicles for not only carrying out the towing function but for also effectively applying the brakes on the trailer vehicle as occasion requires.

Accordingly the invention comprises a hitch bar connection of suitable design for connecting the towing and trailer vehicles in proper towing relation, and also improved operative means for automatically applying the brakes on the trailer vehicle in accordance with requirements, as where the movement of the trailer tends to crowd the towing car.

In carrying out the improved construction, the operating means for the brake-applying connections is arranged in the most effective relation to the brake connections, i. e., for producing the automatic operation of the brakes in substantially the same manner as such operation is effected by the customary foot-pedal action, and arranging the connections for producing this result in such a way as not to be materially affected by the turning movements of the cars.

It is also sought to provide a very practical and comparatively inexpensive construction comprising relatively few parts or complications, so that the appliance may be produced economically and also be substantially fool-proof both as to its method of assembly into operative position as well as regards the operation thereof.

With the foregoing general objects in view, the invention will now be described by reference to the accompanying drawing showing a practically operative construction for embodying the proposed improvements, after which those features and combinations of parts deemed to be novel and patentable will be more particularly set forth and claimed.

In the drawing—

Figure 1 is a plan view of a trailer chassis equipped with a trailer hitch together with the improved brake-operating connections;

Figure 2 is a longitudinal sectional view, representing a section taken on the line 2—2 of Figure 1;

Figure 3 is a sectional detail view of certain parts shown in Figure 2, but on a larger scale;

Figure 4 is a perspective detail of the connections to the axle of the trailer; and Figure 5 is a sectional detail view, representing a section taken on the line 5—5 of Figure 3.

Referring now to the drawing in detail, the construction illustrated comprises a draw bar 5 of channel form having its front end provided with bolt openings 6 for connection with the towing car, and the rear end of said bar being provided with a bolt or pin 7 extending through slots 8 in the sides of a suitable frame member 10 which is adapted to swing sideways on a pivot pin 12 set in a bushing 13 which is mounted in a channel bar 14. This channel bar 14 is attached alongside the axle member 15 of the trailer by means of bolts 16 having bent portions extending through openings 17 in said channel, and these bolts 16 are connected, in pairs, at the opposite ends of the channel by tie-plates 18.

The rear end of the frame member 10 is pivotally connected to a stud 20 carried by an angle piece 21 which is attached by clips 22 to the radius rod 24 of the trailer vehicle.

The bolt or pin 7 is also pivotally connected with the lower end of a lever 26 which is fulcrumed at 25 on said frame member 10 and projects up through a slot 27 in the top of the frame member, and the upper end of the lever 26 is provided with a clip 28 for connecting with a rod 30 extending rearward to an arm 31 projecting up from a rocker shaft 32. This rocker shaft is mounted in bearing brackets 33 attached to the chassis frame 34 of the trailer. This shaft 32 also carries arms 35 for the rods 36 that operate the rear-wheel brakes, and also another pair of arms 37 for the rods 38 for the operation of the front wheel brakes.

The upper end of the lever 26 is provided with a coil spring which is attached, as indicated in Figure 3, to a fixed point (as on the adjacent portion of the frame member 10) in such a way as to maintain the lever 26 normally in brake-releasing position.

A bolt or pin 39 may be passed through an opening 40 in the lever 26 as well as through openings 41 in the frame member 10, for the purpose of locking the parts completely against any operation of the brakes—as in backing of both vehicles.

In the operation of the connections above described, it will of course be understood that the towing car, attached to the draw bar 5, tows the trailer vehicle through the connection of said bar 5 and the frame member 10 to the axle 5 of the trailer, and that this hitch connection also provides for executing the proper turning movements of the trailer, due to the pivotal mounting of said frame member 10 and its connection with the radius rod 24 of the trailer. Moreover, the spring 29 tends to maintain the lever 26, which operates the brake-applying connections, in normally inoperative position, i. e., with no pull on the rod 30 which connects with the brake-operating shaft 32; and so long as any pull is exerted by the draw bar 5 the lever 26 is likewise positively maintained inoperative by the forward position of the pin or bolt 7 at the lower end of said lever, as shown in Figure 3. However, when the forward movement of the trailer exceeds that of the towing car, as when the trailer coasts and crowds the towing car, or at any time when the relative movement of the two vehicles is such as to reduce the distance between them. At such times, obviously the bolt or pin 7 travels rearwardly in the slots 8 and thereby rocks the lever 26 and produces forward movement of the upper end of said lever, with the result that the rod 30 is pulled forward to simultaneously actuate all the brake operating connections 36 and 38. This brake-applying action is of course entirely automatic and in proportion to the movement of said operating lever 26 as produced by the movement of the pin or bolt 7—as will be readily understood.

It will also be seen that the arrangement of the connections between the draw bar 5 and the brake-operating rod 30 is such as not to be affected in any way by the steering movements of the draw bar, no matter how short the turning movement; and moreover that the connection between the upper end of the lever 26 and said rod 30 substantially approximates that of the usual foot pedal relation of the brake-operating connections, i. e., about the axle and in direct horizontal alinement with the upper end of the arm 31 of the brake-operating shaft, so that a highly efficient operating relation is thus obtained for carrying out the brake control function. In the event of its being necessary to dispense entirely with the automatic control connection to the brakes, as in backing movements of the vehicles, all that is required is to insert the pin 39 through the openings 40 and 41 for positively locking the lever 26, whereupon the brake connections will of course remain entirely inoperative.

Having thus described our invention, what we claim and desire to secure by Letters Patent, is:

A trailer hitch and automatic brake-operating means, comprising a draw bar, a frame member fulcrumed upon the axle of the trailer, said frame member being provided with a slot and also having an operating connection with the radius rod of the trailer, a brake-operating lever mounted on said frame and having a brake control connection from its upper end extending rearwardly over the axle of the trailer, and a bolt operating within said slot of the frame member and pivotally connecting the lower end of said lever with said draw bar, whereby the operating movement of said lever is limited by engagement of said bolt with the opposite ends of said slot.

WILLIAM P. NAEGELE.
FRED W. STEENBOCK.